April 16, 1963 J. L. ANDERSON 3,086,197

CRYOGENIC MEMORY SYSTEM

Filed Dec. 19, 1958 5 Sheets-Sheet 1

INVENTOR
JOHN L. ANDERSON

BY John E Dougherty Jr
ATTORNEY

April 16, 1963 J. L. ANDERSON 3,086,197

CRYOGENIC MEMORY SYSTEM

Filed Dec. 19, 1958 5 Sheets-Sheet 2

April 16, 1963 J. L. ANDERSON 3,086,197

CRYOGENIC MEMORY SYSTEM

Filed Dec. 19, 1958 5 Sheets-Sheet 3

April 16, 1963 J. L. ANDERSON 3,086,197

CRYOGENIC MEMORY SYSTEM

Filed Dec. 19, 1958 5 Sheets-Sheet 4

April 16, 1963 J. L. ANDERSON 3,086,197

CRYOGENIC MEMORY SYSTEM

Filed Dec. 19, 1958 5 Sheets-Sheet 5

United States Patent Office 3,086,197

Patented Apr. 16, 1963

3,086,197

CRYOGENIC MEMORY SYSTEM

John L. Anderson, Poughkeepsie, N.Y., assignor to International Business Machines Corporation, New York, N.Y., a corporation of New York Filed Dec. 19, 1958, Ser. No. 781,749
30 Claims. (Cl. 340—173.1)

The present invention relates to memory devices and systems and, more particularly, to superconductor storage devices, and to circuitry for controlling read and write operations for individual superconductor storage devices as well as for memory systems which include a plurality of such devices.

The large majority of superconductor storage devices thus far developed have been binary type devices which may be generally classified as either persistent current storage devices or flip flop type storage devices. A persistent current storage device usually consists of a closed loop of superconductor material in which binary information is stored in the form of persistent currents, the two binary states being represented either by persistent currents flowing in opposite directions or by the presence and absence of persistent currents. Persistent currents may be stored in such devices by using a single control or input conductor which is coupled to the superconductive loop to both drive a portion of the loop between resistive and superconductive states and to provide a flux which induces a persistent current in the loop. Persistent currents may also be stored by applying a current directly to the loop and causing resistance to be introduced in one of two current paths which form the loop. As a result, when the applied current is removed after the entire loop is allowed to become superconductive, a persistent current is stored in the loop. The flip flop type storage devices are analogous to vacuum tube flip flop circuits and include two superconductor current paths connected in parallel with a D.C. current source. The two stable states of the device are achieved by introducing resistance into one or the other of these paths and thereby causing the current from the source to flow entirely in the other path. It has been usual to interrogate superconductor storage devices of both types by providing a superconductor gate conductor which is subject to magnetic fields produced by current in the device so that the state of this gate conductor, superconductive or resistive, is indicative of the binary state of the device. Interrogation has also been achieved by switching the storage device between its stable states and magnetically sensing the change of current therein. The latter method of interrogation is destructive while the former is non-destructive. Memory systems have been proposed which include a plurality of superconductor storage devices which may be selectively addressed for read and write operations. However, in most of these systems it has been necessary to provide separate address selection circuitry for controlling these operations and in the cases where common address circuitry is employed to control both read and write operations, the read operation has been destructive.

In accordance with the principles of the present invention, improved superconductor memory systems are provided which include control circuitry which is effective to select an individual storage device or a group of such devices for either a read or write operation and to then control reading or writing in the storage device or group of storage devices selected. The address selection and read and write control circuitry herein disclosed by way of illustrating the invention is usable in nondestructive interrogation systems which may employ any one of a variety of different types of superconductor storage devices. These storage devices may be either bistable or, in accordance with the principles of the invention, may be capable of assuming more than two stable states and, therefore, capable of storing information in notations other than binary. As is illustrated in the embodiments of the invention disclosed therein, the improved memory systems are realized in accordance with the principles of the invention by providing address selection and read and write control circuitry which includes a read control current path, a write control current path and a plurality of address selection current paths. These paths are fabricated of superconductor material and are connected in parallel across a current source. A shunt current path may also be provided and this path is also fabricated of superconductor material and is connected in parallel with the read, write and address selection paths. Each of the paths is provided with a control conductor which is effective when energized to introduce resistance into that path. The address selection current paths may be arranged so that there is an X address selection path and a Y address selection path for each of the individual storage devices in the memory or the memory may be divided into a plurality of registers each including a number of storage devices with each register being addressed under the control of a particular pair of X and Y address selection current paths. Each read or write operation is initiated by energizing the control conductors for the read and write current paths and the control conductors for the particular X and Y current paths associated with a selected storage device or register. Thereafter, the control conductors are deenergized and energized in different sequences in accordance with the operation to be performed. The various control current paths may be in conventional wire form or may be fabricated of apertured strips of superconductor material. The individual storage devices in the memory may be either binary storage devices or devices for storing information expressed in another notation such as decimal. One embodiment disclosed herein shows a system of the latter type using, as storage devices, loops of superconductor material in which, in accordance with the principles of the invention, a different magnitude of persistent current is stored for each decimal information value.

It is a principal object of the present invention to provide improved superconductor memory systems.

A further object is to provide an improved superconductor memory system which may be interrogated nondestructively.

Still a further object is to provide superconductor memory systems of the above described types wherein a single address selection circuit is employed to address the memory for all functional operations.

Still another object is to provide improved address selection and read and write control circuitry which may be used with superconductor memories regardless of the type of individual storage devices used in the memory.

Another object is to provide improved address selection, read and write control circuitry which may be employed in memory systems of the binary type as well as in systems employing other arithmetic notations.

A further object is to provide a superconductor storage device and circuit capable of assuming more than two stable states and, therefore, capable of storing information in notations other than binary.

Another object is to provide superconductor storage devices for storing decimal values.

A further object is to provide a decimal superconductor storage system.

These and other objects of the invention will be pointed out in the following description and claims and illustrated in the accompanying drawings, which disclose, by way of example, the principle of the invention and the best mode, which has been contemplated, of applying that principle.

Figures 1, 2:
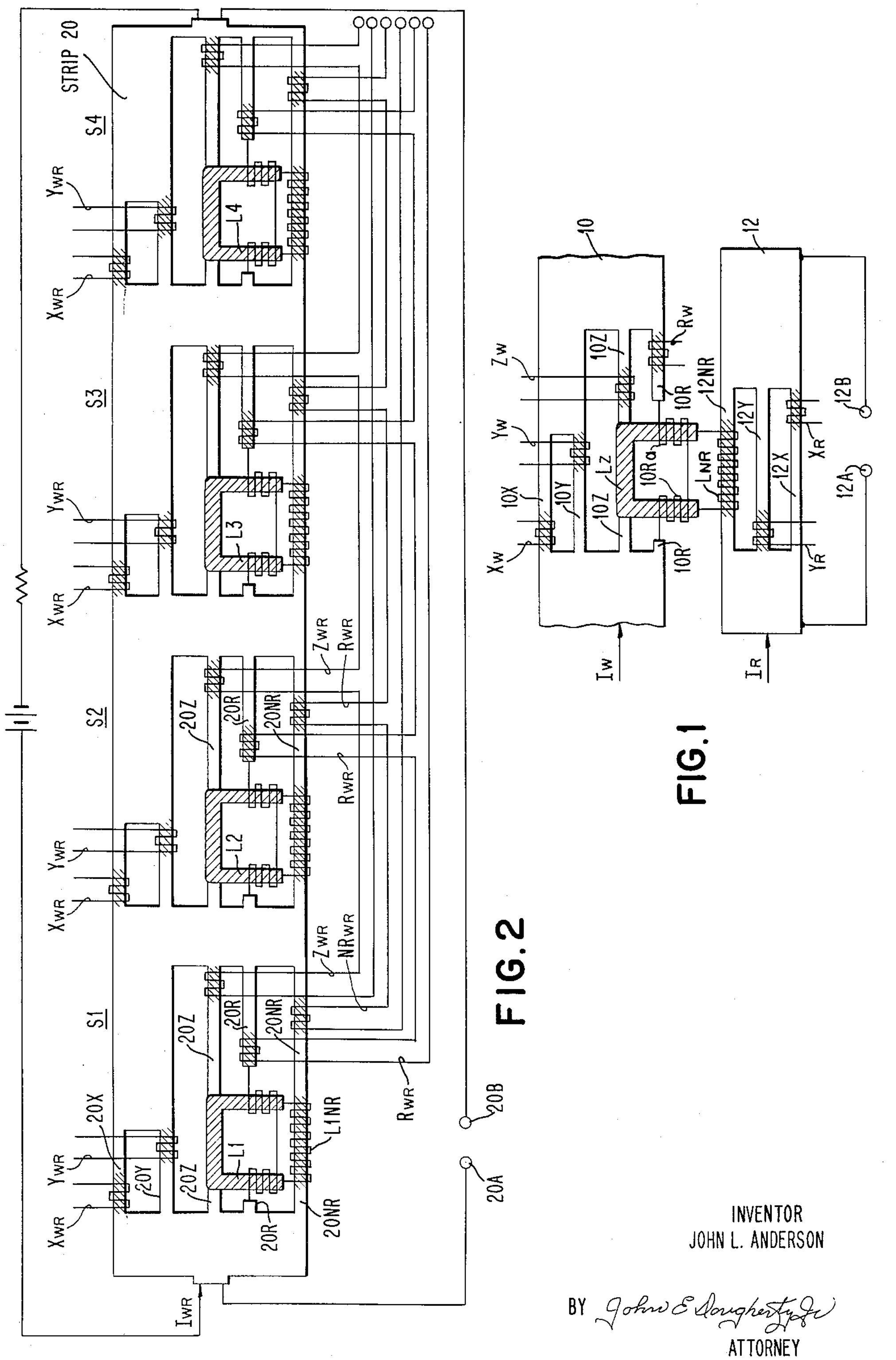
FIG. 1 is a schematic representation of a storage device and thin film control circuitry for the device.
FIG. 2 is a schematic representation of a film type memory including a plurality of storage devices and the control circuitry for individually addressing any one of the storage devices in the memory and performing read and write operations therein.

The storage device shown in FIG. 1 includes two strips, one a write strip 10 and the other a read strip 12. Each of these strips is provided with a plurality of apertures which divide the strips into a number of parallel current paths. Write strip 10 includes parallel paths 10X, 10Y, 10Z, and 10R, and read strip 12 includes paths 12NR, 12X, and 12Y. The path 10R of strip 10 is shown to include a thin section resembling a wire. This section is actually part of the path and is in the form of a relatively narrow strip of material, but it, like other conductors which are employed to control portions of the circuit between superconductive and resistive states, is shown in this form in the interests of providing a more graphic illustration. Write strip 10 is provided with a longitudinal current $I_W$ and read strip 12 with a longitudinal current $I_R$. Storage of binary information is in the form of persistent currents in a closed superconductor loop L which is arrnaged adjacent parallel paths 10Z and 10R of write strip 10 and path 12NR of read strip 12. Persistent currents are selectively stored and destroyed in this loop by shifting the current $I_W$ in strip 10 between the parallel paths in predetermined sequences and, information is read out of the device by controlling the current $I_R$ in strip 12.

The storage circuit of FIG. 1 is fabricated entirely of superconductor material with those portions of the circuit which are cross hatched being made of a soft superconductive material and the remaining portions being made of a hard superconductive material. The terms hard and soft superconductor are relative, the former term meaning a superconductor requiring a magnetic field of relatively high intensity to drive it resistive at the operating temperature of the circuit and the latter term meaning a superconductor which requires a magnetic field of relatively low intensity to drive it resistive at the operating temperature of the circuit. For example, the circuit of FIG. 1 might be operated at a temperature in the vicinity of 3.7° K. in which case lead would be used for the hard superconductor portions of the circuit and tin for the soft superconductor portions.

Information is stored in loop L under the control of a plurality of control inputs in the form of control conductors designated $X_W$, $Y_W$, $Z_W$, and $R_W$. Each of these control conductors is arranged in magnetic field applying relationship to a soft superconductor portion of a corresponding one of the parallel paths 10X, 10Y, 10Z, and 10R of strip 10. Since each of these control conductors is fabricated of a hard superconductor, it can apply sufficient magnetic field to the corresponding soft superconductor portion to drive it resistive and still remain in a superconductive state. Further, even though certain of the control conductors traverse more than one of the parallel paths, each traverses the soft superconductor section of one path only and is effective when energized to introduce resistance only into that path. Thus, when, for example, control conductor $Y_W$ is energized a magnetic field is thereby applied to sections of both paths 10X and 10Y, but the section of path 10X which is subjected to this field is a hard superconductor and remains superconductive while the soft superconductor section of path 10Y which is subjected to the field is driven into a resistive state. Other methods of fabrication may be employed so that a control conductor which traverses more than one superconductor path is effective when energized to drive only one of these paths resistive. For examples of such methods reference may be made to copending application, Serial No. 765,760, filed October 7, 1958, now Patent No. 3,047,230 and assigned to the assignee of this application.

If it is assumed that a binary one is stored in loop L when there is a persistent current stored therein and a binary zero is stored when there is no persistent current in the loop, the manner in which the various control conductors are energized to enter information is set forth below:

| | Write—Store a Binary One | Reset—Store a Binary Zero |
|---|---|---|
| Step 1 | Energize conductors $X_W$, $Y_W$, $Z_W$, and $R_W$. | Energize conductors $X_W$, $Y_W$, $Z_W$, and $R_W$. |
| Step 2 | Deenergize conductor $Z_W$ | Deenergize conductor $R_W$. |
| Step 3 | Deenergize conductors $X_W$, and $Y_W$ | Deenergize conductors $X_W$ and $Y_W$. |
| Step 4 | Energize conductor $Z_W$ | Energize conductor $R_W$. |
| Step 5 | Deenergize conductors $Z_W$, and $R_W$. | Deenergize conductors $Z_W$, and $R_W$. |

Considering the write operation first and, specifically, Step 1 of this operation, the coincident energization of control conductors $X_W$, $Y_W$, $Z_W$, and $R_W$ introduces resistance into each of the paths 10X, 10Y, 10Z, and 10R so that the current $I_W$ divides equally between these paths. When, during Step 2, control conductor $Z_W$ is deenergized the entire current $I_W$ is shifted into path 10Z. This path is arranged adjacent a portion of loop L so that a current in the path is effective to produce a magnetic field which both threads this loop and is applied to a soft superconductor segment of the loop which is designated $L_Z$. The design of the conductor forming path 10Z and the magnitude of the current $I_W$ is such that, when the entire current $I_W$ is in path 10Z, a magnetic field of sufficient intensity is applied to segment $L_Z$ to drive this segment resistive.

The next step in the operation, Step 3, is to deenergize control conductors $X_W$, and $Y_W$ to allows paths 10X and 10Y to again become superconductive. However, since path 10Z is still in a superconductive state there is no shifting of the current $I_W$ from this path and segment $L_Z$ of loop L continues to be maintained resistive. When, however, during Step 4, control conductor $Z_W$ is again energized, resistance is introduced into path 10Z causing the current $I_W$ to be shifted out of this path and into the now superconductive paths 10X and 10Y. As this current shifting occurs segment $L_Z$ becomes superconductive at a time when there is still flux produced by current $I_W$ in path 10Z threading loop L. Since the net flux threading a superconductive loop cannot be changed, the continued shifting of current $I_W$ out of path 10Z after segment $L_Z$ becomes superconductive causes a persistent current to be established in this loop. This persistent current remains circulating in the loop until some portion of the loop is driven resistive.

The last step in the write operation, Step 5, is to deenergize control conductors $Z_W$ and $R_W$, but since the entire current $I_W$ is already divided between the now superconductive paths 10X and 10Y, no current is shifted into paths 10Z or 10R when they become superconductive. Thus, it can be seen that as a result of the five step write operation, a persistent current representative of a binary one is stored in loop L, and the current $I_W$ is divided between superconductive paths 10X and 10Y.

Three of the five steps for a reset operation correspond to the steps of a write operation, the only difference between the two operations being that during Steps 2 and 4 of a write operation, conductor $Z_W$ is deenergized and energized whereas during Steps 2 and 4 of a reset operation conductor $R_w$ is deenergized and energized. As a result, during Step 2 of a reset operation the entire current $I_W$ is directed to path 10R rather than path 10Z. Path 10R includes two segments 10R*a* which is shown in wire like form and is arranged in magnetic field applying relationship to a segment of loop L but which is not inductively coupled to the loop. This is accomplished by arranging the segments 10R*a* so that the fields produced by these segments when energized are substantially parallel to the portions of the loop L which are driven resistive by the fields. These parallel fields therefore, do not produce any flux which links loop L. Therefore, when the current $I_W$ is directed through path 10R during Step 2 of a reset operation, resistance is introduced into loop L to quench any persistent current which may be circulating in the loop. When, during Step 4 of the reset operation conductor $R_W$ is again energized to shift the current $I_W$ from path 10R to paths 10X and 10Y, no persistent current is induced in loop L since path 10R is not magnetically coupled to this loop, that is, current in this path does not produce any net flux threading loop L. Thus, after the fifth step of a reset operation during which both of the conductors $Z_W$ and $R_W$ are deenergized, the current $I_W$ is divided between paths 10X and 10Y as was the case after completion of a write operation, and there is no current stored in loop Z so that the memory device is in its reset or binary zero state.

The read operation is a single step operation which is similar to the read operation described in copending application, Serial No. 615,814, filed October 15, 1956 and assigned to the assignee of the subject application. The state, superconductive or resistive, of the soft superconductor sections of paths 12X, 12Y, and 12NR of read strip 12 is determined by the presence or absence of a control current in conductors $X_R$, $Y_R$, and loop L, respectively. Loop L includes a segment $L_{NR}$ which is arranged in magnetic field applying relationship to path 12NR of read strip 12. When there is a persistent current circulating in loop L, that is when the memory device is storing a binary one, path 12NR is resistive. When there is no persistent current in loop L and the device is, therefore, in its binary zero state, path 12NR is superconductive. The device is interrogated by energizing conductors $Y_R$ and $X_R$ to thereby drive paths 12Y and 12X resistive. When the device is storing a binary one and path 12NR is resistive, there is no completely superconductive path for the read current $I_R$ and, therefore, an output voltage is manifested between a pair of output terminals 12A and 12B. When, however, the device is storing a binary zero and path 12NR is superconductive, the entire current $I_R$ is directed through this superconductive path when control conductors $X_R$ and $Y_R$ are energized and no voltage output is produced between terminals 12A and 12B, other than a possible transient which is produced if there is a current shift from paths 12X and/or 12Y to path 12NR.

It should be apparent that for any one of the above described write and read operations both of the X and Y control conductors must be energized. For example, if during an operation in which either a binary one (write) or binary zero (reset) is to be entered into the storage device, only one or neither of the control conductors $X_W$ and $Y_W$ are energized during Step 1, the entire current $I_W$ is then directed through the path or paths 10X and 10Y which remains superconductive. Since no further energizing pulses are applied to the X and Y conductors during the subsequent four steps of the operation, the path or paths 10X and 10Y remain superconductive and once the current $I_W$ is established in one or both of these paths, the current distribution remains unchanged during the other steps of the operation. As a result, even though path 10Z is allowed to become superconductive during Step 2 of a write operation and the path 10R is allowed to become superconductive during Step 2 of a reset operation, the current $I_W$ remains entirely in the one or both of the paths 10X and 10Y which are then in a superconductive state and the state of loop L is not affected. Similarly if, during a read operation, one or the other or both of the control conductors $X_R$ and $Y_R$ are not energized, one or the other of the paths 12X and 12Y remain superconductive and no voltage output is developed between terminals 12A and 12B regardless of the state of path 12NR. It is, of course, obvious the the X control conductors $X_W$ and $X_R$ may be connected in series and energized by the same current source and similarly the $Y_W$ and $Y_R$ control conductors.

Since, as above explained, the memory device of FIG. 1 must be addressed with signals on both of its $X_W$ and $Y_W$ control conductors for a write or reset operation and must be addressed with signals on both of its $X_R$ and $Y_R$ conductors for a read operation, the strips 10 and 12 may be much longer than shown and may include a number of storage devices of the type shown. Each such device is provided with a particular combination of X and Y control conductors for addressing the devices during write, reset, and read operations so that during any such operation only the one of the devices controlled by both the X and Y control conductors to which address signals are applied is affected.

A multi-bit storage device of this type is shown in FIG. 2 wherein storage devices similar to that of FIG. 1 are employed. The devices of FIG. 2 differ from that of FIG. 1 in that the devices of the latter figure employ only a single strip to which a current $I_{WR}$ is applied to accomplish both reading and writing. In FIG. 2 four storage devices S1, S2, S3, and S4 are shown to be fabricated using a single strip 20, and four persistent current loops L1, L2, L3, and L4. The current $I_{WR}$ is selectively shifted in the strip 20 to control the entering of information in these storage devices and the interrogation of the devices. These operations are controlled by signals applied to write, read and reset control conductors $Z_{WR}$, $NR_{WR}$, and $R_{WR}$, and individual X and Y address selection conductors $X_{WR}$ and $Y_{WR}$. Referring to the device S1, it can be seen that the control conductors $Z_{WR}$, $R_{WR}$, and $NR_{WR}$ are arranged in magnetic field applying relationship to soft superconductor sections of paths 20Z, 20R, and 20NR, respectively, and the address control conductors $X_{WR}$ and $Y_{WR}$ are arranged in magnetic field applying relationship to soft superconductor sections of paths 20X and 20Y, respectively. The write, reset and read operations for each of the storage devices S1, S2, S3, and S4 of FIG. 2 are similar to the operation above described for the device of FIG. 1. The steps necessary for each of these operations for the device S1 of FIG. 2 are listed below.

| | Write (Store a binary one) | Reset (Store a binery zero) | Read |
|---|---|---|---|
| Step 1 | Energize $X_{WR}$, $Y_{WR}$, $Z_{WR}$, $R_{WR}$, and $NR_{WR}$. | Same | Same. |
| Step 2 | Deenergize $Z_{WR}$ | Deenergize $R_{WR}$ | Deenergize $NR_{WR}$. |
| Step 3 | Deenergize $X_{WR}$ and $Y_{WR}$. | Same | Same. |
| Step 4 | Energize $Z_{WR}$ | Energize $R_{WR}$ | Energize $NR_{WR}$. |
| Step 5 | Deenergize $Z_{WR}$, $R_{WR}$, and $NR_{WR}$. | Same | Same. |

Steps 1, 3, and 5 are the same for write and reset and read operations. The write and reset operations are exactly the same as the write and reset operations for the device of FIG. 1 with the exception that, in the device of FIG. 2, another conductor $NR_{WR}$ is energized during the first step of each operation so that the entire device is initially driven resistive and this conductor is maintained energized until the last step of the operation. Otherwise, the operations are the same, the entire current $I_{WR}$ being directed first to path 20Z for a write operation and to path 20R for a reset operation and thence back to the paths 20X and 20Y controlled by the address selection control conductors $X_{WR}$ and $Y_{WR}$.

During a read operation the current $I_{WR}$ is directed through path 20NR. Path 20NR is maintained resistive when there is persistent current stored in loop L1 by a segment $L1_{NR}$ connected in that loop. Therefore, during the read operation, when the storage device S1 is storing a binary one, an output voltage is produced between terminals 20A and 20B, and, when the storage device S1 is storing a binary zero and, therefore, there is no current in loop L1, path 20NR is superconductive and no output voltage is manifested between 20A and 20B.

The operation of each of the individual storage devices S1, S2, S3, and S4 of FIG. 2 is the same. The control conductors $Z_{WR}$, $R_{WR}$, and $NR_{WR}$ for each of the devices are connected in series so that during each of the above described operations the paths 20Z, 20R, and 20NR for each of the storage devices S1, S2, S3, and S4 are driven resistive and allowed to become superconductive under the control of signals applied to these control conductors. The particular one of the storage devices which is to be affected during any write, reset, or read operation is controlled by the signals applied to the X and Y address conductors for each of these devices. Thus, if it is assumed, for example, that each of the $X_{WR}$ control conductors for the devices S1, S2, S3, and S4 are connected in series so that when one of these control conductors receives a signal, all receive a signal, and, further, that the individual $Y_{WR}$ control conductors are connected individually to different address signal sources. The particular one of the storage devices which is affected during any given operation is determined by the particular one of the $Y_{WR}$ control conductor which is then energized. For example, if during any such operation, the $X_{WR}$ control conductor for each of the storage devices is energized and the $Y_{WR}$ control conductor for storage device S2 only is energized, it is only this device which will undergo a write, reset or read operation, in accordance with the manner in which the signals are applied to the $Z_{WR}$, $R_{WR}$, and $NR_{WR}$ control conductors. In each of the other storage devices the path 20Y remains superconductive throughout the operation so that the entire current $I_{WR}$ is initially directed through this path and remains in this path throughout the entire operation. Thus, it may be summarily stated that, in the multi-bit storage device of FIG. 2, the selection of a particular storage device for any operation is under the control of the $X_{WR}$ and $Y_{WR}$ control conductors, and the particular operation which is to be performed on the addressed storage device is determined by the sequence of signals applied to the $Z_{WR}$, $R_{WR}$, and $NR_{WR}$ control conductors.

Figure 3:
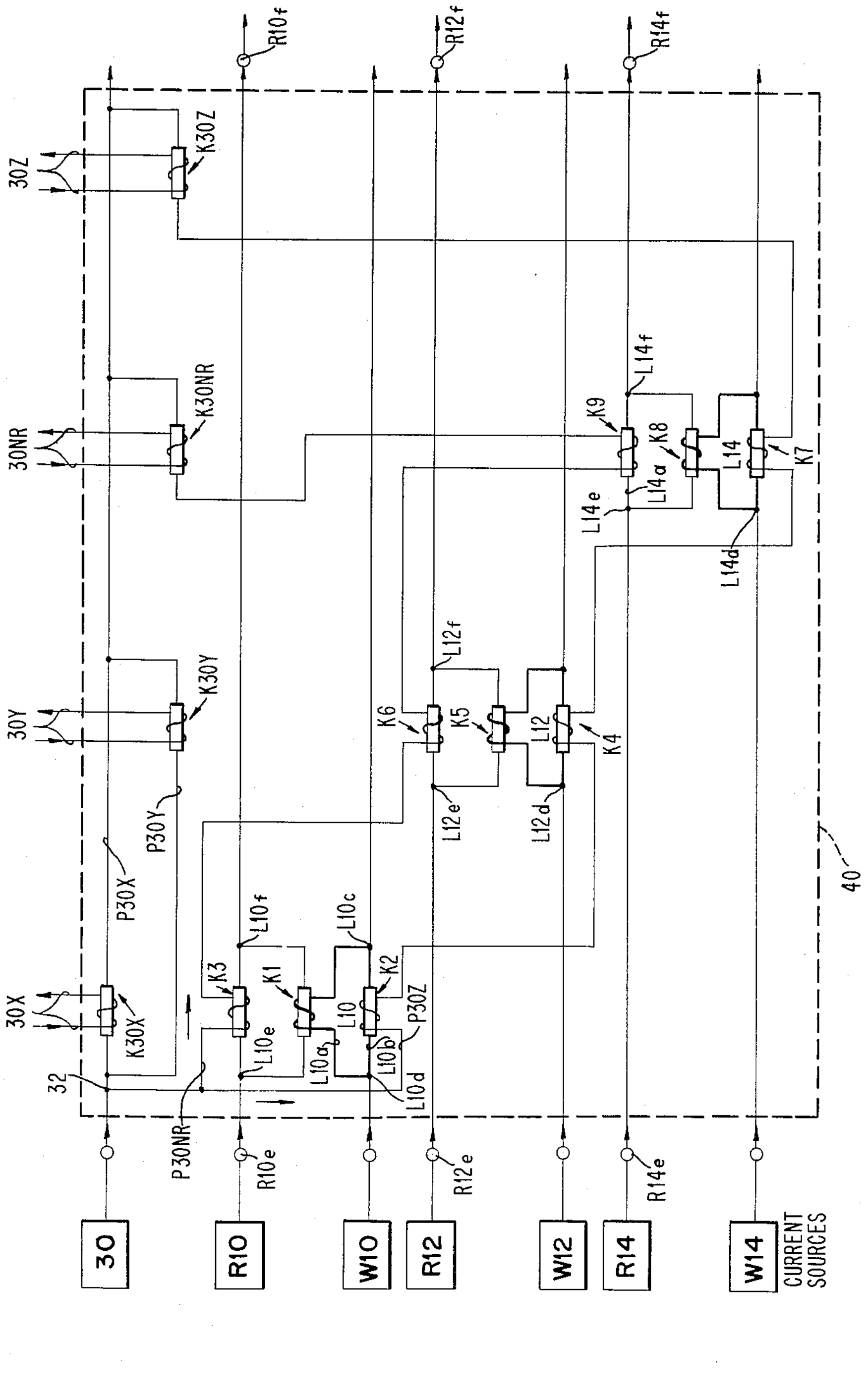
FIG. 3 is a schematic representation of a register including a plurality of storage devices together with the control circuitry for simultaneously addressing all of the storage devices in the register and performing read and write operations therein.

FIG. 3 shows a superconductor memory system capable of storing three orders or bits of information, which may be considered to form a word of information. In the embodiment shown in this figure, wire wound cryotron type devices are illustrated rather than the planar film structure of FIGS. 1 and 2. The wire wound type representation is believed to be more graphic and, for this reason as well as to demonstrate that wire wound cryotrons, as well as planar thin film type cryotrons, may be employed in fabricating circuits and devices in accordance with the principles of the invention, this type representation is used in FIG. 3 and in the remainder of the drawings. The circuit of this figure differs from that of the previous figures in the manner in which persistent currents are stored and further in that all three of the storage positions are addressed by energizing a particular X and particular Y address line. The loops in which the information words are stored are shown in heavy lines and are designated L10, L12, and L14. Information representing persistent currents is stored in these loops by a current drive method rather than by inducing the persistent currents since this type of operation lends itself more readily to addressing a plurality of storage positions simultaneously in accordance with the principles of the present invention.

Referring specifically to loop L10, it can be seen that this loop includes two current paths L10*a* and L10*b* extending between a pair of terminals L10*c* and L10*d*. Path 10*a* includes the control coil of a cryotron K1 and path 10*b* includes the gate of a cryotron K2. When, with paths L10*a* and L10*b* entirely superconductive, a current is applied at terminal L10*d* of this loop, the applied current divides between paths L10*a* and L10*b* inversely in proportion to the inductances of these paths. If the applied current is thereafter terminated, the current decays in these paths again in accordance with the inductances of the paths so that no current is stored in the loop. If, however, the control coil of cryotron K2 is energized so that the gate of cryotron K2 is resistive, a current applied at terminal L10*d* is directed entirely through superconductor path L10*a*. Once the current distribution is established, the gate of cryotron K2 may be allowed to again assume a superconductive state without disturbing the current distribution. If thereafter, with the loop L10 entirely superconductive, the applied current is terminated, a persistent current is established in the loop. The magnitude of the persistent current is dependent both upon the magnitude of the applied current and the ratio of the inductances of paths L10*a* and L10*b*.

Thus, it can be seen that a persistent current can be stored in loop L10 by applying a current at terminal L10*d*, causing the gate of cryotron K2 to be driven resistive, allowing this gate to become superconductive after the applied current is established in path 10*a*, and then terminating the applied current. A persistent current thus stored in the loop may be quenched merely by causing the gate of cryotron K2 to be driven resistive at a time when no current is applied at terminal L10*d*. The cryotron K2, therefore, serves as a control input for conditioning the loop for either a reset or write operation. During a write operation (store a binary one), a current is applied at terminal L10*a* when the loop is conditioned by properly energizing and deenergizing the control coil of cryotron K2. During a reset operation (store a binary zero) this control coil is similarly energized and deenergized but no current input is applied at terminal L10*d*.

The other cryotron associated with loop L10, that is cryotron K1, serves as an output for the loop. The gate of this cryotron is resistive when a persistent current is stored in the loop and is superconductive when there is no persistent current stored in the loop. The output for loop L10 is realized between a pair of terminals L10*e* and L10*f* when a current is caused to flow between these terminals. A voltage appears between these terminals when a read out current is applied at a time when the gate K1 is held resistive by a persistent current in loop L10 and the gate of a cryotron K3 is held resistive by a current in its control coil. This latter cryotron therefore serves as a means for controlling read out operations. When the gate of this cryotron is superconductive or when the gate of cryotron K1 is superconductive, no voltage will be developed between terminals L10*e* and L10*f* when a read out signal is applied.

Persistent current storage loops L12 and L14 are similarly constructed, having respectively associated therewith input control cryotrons K4 and K7, read out cryotrons K5 and K8, and read out control cryotrons K6 and K9. The three storage loops L10, L12 and L14 are simultaneously addressed for write, reset, and read operations under the control of four control conductors 30X, 30Y, 30NR, and 30Z which control the gates of cryotrons K30X, K30Y, K30NR, and K30Z between resistive and superconductive states. These gates are connected respectively in paths P30X, P30Y, P30NR, and P30Z, and these paths are connected in parallel across a current source 30. The current from the source 30 is shifted between these paths in selected sequences to control the various input and output operations of the memory. The current from source 30 actually serves to condition the loops L10, L12, and L14 for the various memory operations with the actual reading and writing being accomplished by current provided by read and write current sources associated with each of the loops. Thus, three read pulse generators designated R10, R12, and R14 are connected to terminals L10*e*, L12*e*, and L14*e* in the output circuits for loops L10, L12, and L14, respectively, and three write pulse generators W10, W12, and W14 are connected to the terminals L10*d*, L12*d*, and L14*e* for the loops L10, L12, and L14, respectively. The operation of the circuit is best demonstrated by considering a particular illustrative example. Thus, there are listed below the steps which are required to enter the word "101" into the memory and then non-destructively interrogate the memory to obtain outputs indicative of this word.

| | Write Operation to Store Word "101" | Read Operation |
|---|---|---|
| Step 1 | Energize 30X, 30Y, 30NR, 30Z. | Same. |
| Step 2 | Deenergize 30Z | Deenergize 30NR. |
| Step 3 | Energize pulse generators W10 and W14. | Energize pulse generators R10, R12, and R14. |
| Step 4 | Deenergize 30X and 30Y | Same. |
| Step 5 | Energize 30Z | Energize 30NR. |
| Step 6 | Deenergize pulse generators W10 and W14. | Deenergize pulse generators R10, R12, and R14. |
| Step 7 | Deenergize 30NR and 30Z | Same. |

The operational steps are similar to those performed for the embodiments of FIGS. 1 and 2. Consider first the write operation during which the word 101 is entered in the memory. During the first step of this operation the gates of cryotrons K30X, K30Y, K30NR, and K30Z are driven resistive thereby introducing resistance into each of the paths P30X, P30Y, P30NR, and P30Z which are connected in parallel across source 30. The current from this source is then divided between these paths. When Step 2 is performed by deenergizing conductor 30Z the entire current from source 30 is then directed through the now completely superconductive path P30Z. This path includes the control conductors for the input cryotrons K2, K4, and K7 for the storage loops L10, L12, and L14. The gates of these cryotrons are driven resistive by the current in path P30Z thereby quenching any persistent current which might be circulating in these loops. When current is applied during Step 3 by pulse generators W10 and W14 to terminals L10*d* and L14*d* of loops L10 and L14, respectively, this applied current is directed in loop L10 through path L10*a* and in loop L14 through path L14*a*. During Steps 4 and 5, control conductors 30X and 30Y are deenergized and conductor 30Z energized so that the current from source 30 is shifted out of path P30Z to paths P30X and P30Y. As a result of this current shifting, the gates of cryotrons K2, K4, and K7 again become superconductive so that, when the currents applied by sources W10 and W14 are terminated during Step 6, persistent currents are stored in loops L10 and L14. No persistent current is stored in loop L12 since no current was supplied during this operation by source W12. The seventh and final step in the operation is to deenergize conductors 30NR and 30Z and allow paths P30NR and P30Z to again become superconductive. The current from source 30, however, remains in paths P30X and P30Y which were allowed to become superconductive during Step 4. Thus, upon completion of the above described operation, persistent currents representative of binary ones are stored in loops L10 and L14 and loop L12 is in a reset of binary zero state with no persistent current stored therein; each of the paths P30X, P30Y, P30NR and P30Z is completely superconductive but the entire current from source 30 is equally divided between paths P30X and P30Y.

Steps 1, 4, and 7 of the read operation are the same as the corresponding steps of the above described write operation. The operation differs in that the memory is controlled for reading by deenergizing and energizing control conductor 30NR during Steps 2 and 5, and the actual read is accomplished by currents applied by sources R10, R12, and R14. When control conductor 30NR is deenergized during Step 2 of a read operation, the entire current from source 30 is directed through path P30NR. This path includes the control conductors for the read out control cryotrons K3, K6 and K9 for loops L10, L12, and L14 and the gates of these cryotrons are, therefore, driven resistive. When, during the following step, currents are applied by sources R10, R12, and R14 to the output circuits of loops L10, L12, and L14, voltages are developed between the output terminals L10*e* and L10*f* for loop L10 and between terminals L14*e* and L14*f* for loop L14 since the persistent currents stored in these loops maintain the gates of cryotrons K1 and K8 resistive. However, no output is produced between the terminals L12*e* and L12*f* in the output circuit of loop L12 since there is no persistent current stored in this loop and the gate of cryotron K5 provides a superconductive path for the current supplied by source R12. Since, at no time during this read operation is there a sufficient current directed through path P30Z to drive the gates of cryotrons K2, K4, and K7 resistive, the read out operation does not disturb the information stored in the various loops. At the end of the read out operation, loops L10 and L14 are in a binary one state, loop L12 is in a binary zero state, each of the paths P30X, P30Y, P30NR, and P30Z is superconductive, and the entire current from source 30 is divided between paths P30X and P30Y The entire memory may be reset to a zero state merely by going through a write operation, as described above, during which none of the write current sources W10, W12 and W14 are energized. However, it should be noted that when it is desired to enter a new word in the memory at a time when it is storing a word, only a single write operation is required. The shifting of the current from source 30 to path P30Z during Step 2 of a write operation ensures that all of the loops are reset to their zero state before the new word of information is entered in the form of currents applied by sources W10, W12, and W14.

As in the embodiments of FIGS. 1 and 2, the three position memory register of FIG. 3 is addressed under the control of the X and Y control conductors 30X and 30Y. If only one or neither of these conductors are energized during a read or write operation, the current from source 30 remains in the path or paths, P30X and P30Y, throughout the entire operation so that storage loops L10, L12, and L14 cannot be conditioned for either writing or reading. Further, the voltage outputs developed between terminals L10*e* and L10*f*, L12*e* and L12*f*, and L14*e* and L14*f* may be sensed at the terminals R10*e* and R10*f*, R12*e* and R12*f*; and R14*e* and R14*f*. Thus, it becomes apparent that a plurality of the registers of FIG. 3 may be connected together in a memory with each register being addressed by a pair of associated X and Y drive lines. A multi register memory of this type is shown in FIG. 4, wherein each of the blocks designated 40A, 40B, and 40C represents a register including the structure shown within the broken line block 40 of FIG. 3.

Figure 4:
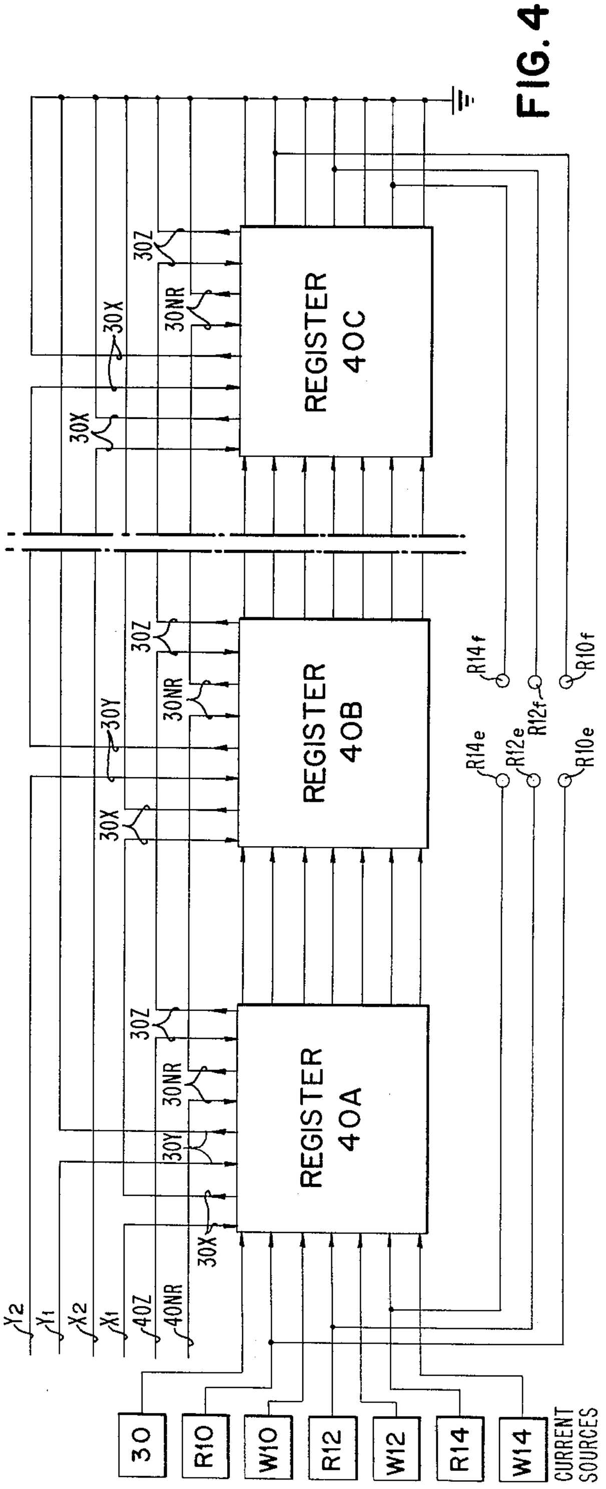
FIG. 4 shows a memory including a plurality of the registers of the type shown in FIG. 3.

In the multi register embodiment of FIG. 4, the current sources are identified with the same reference numerals as were used in FIG. 3. Each of the three position registers shown is connected in series with the current source 30 and the current from this source is shifted between the four parallel current paths in each register under the control of signals applied by the control conductors 30X, 30Y, 30NR, and 30Z for that register Sources R10, R12, and R14 apply read currents and sources W10, W12, and W14 apply write currents to the first, second and third order storage positions, respectively, of each register. The 30Z and 30NR control conductors for each of the registers 40A, 40B, and 40C are connected in series and are energized by current pulses applied to lines 40Z and 40NR, respectively There are two X address drive lines, $X_1$, $X_2$, and two Y address drive lines $Y_1$ and $Y_2$ for the memory. The 30X and 30Y control conductors for the three registers shown are so connected to these drive lines that register 40A is addressed by coincidently energizing lines $X_1$ and $Y_1$; register 40 B is addressed by coincidently energizing lines $X_1$ and $Y_2$; and register 40C is addressed by coincidently energizing drive lines $X_2$ and $Y_2$. During each memory operation, the X and Y address lines, the 40Z and 40NR control lines, and the read or write pulse sources are energized in accordance with the sequences described above with reference to FIG. 3. During any such operation, whether it be a read or write operation, the only register affected is the one controlled by the two X and Y address lines which are energized. The first, second, and third order outputs for the multi register memory are taken between terminals R10*e* and R10*f*, R12*e* and R12*f*, and R14*e* and R14*f*. Again the presence or output of a voltage between these pairs of terminals during any read out operation indicates whether a binary one or a binary zero is stored in the corresponding order of the register and addressed by the particular X and Y drive lines energized during this read out operation.

Figure 5A:
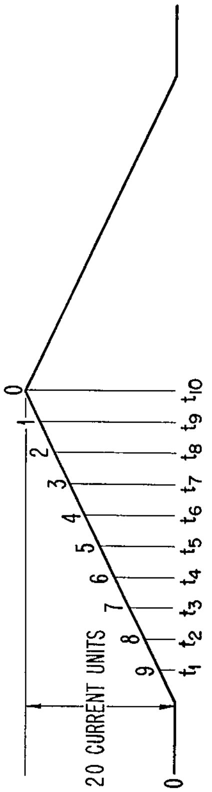
FIG. 5A is a wave diagram illustrating one type of interrogation signal which may be applied to the storage device of FIG. 5 when it is used to store decimal information values.
Figure 5:
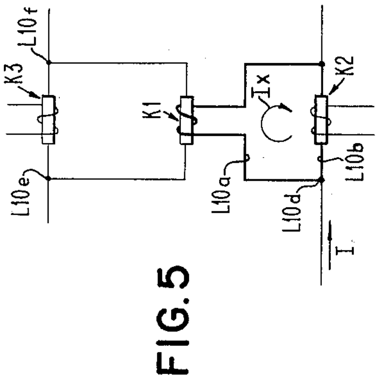
FIG. 5 is a reproduction of one of the storage devices used in the register of FIG. 3.

FIG. 5 shows an individual storage loop and output circuit of the type used in the embodiments of FIGS. 3 and 4. The reference characters in FIG. 5 correspond to those used to identify the various components of loop L10 in FIG. 3, the operation of which has been described in detail. This portion of FIG. 3 is reproduced here as FIG. 5 in order to facilitate the explanation of the manner in which information values in orders other than binary and, therefore, requiring storage elements capable of assuming more than two stable states, may be stored in and read out of storage loops such as L10 in a single multi bit register such as is shown in FIG. 3 or in a multi-register memory of the type shown in FIG. 4. As has been stated above, when a current input is applied at terminal L10*d* with the gate of cryotron K2 resistive and this current is removed after the gate of cryotron K2 is allowed to become superconductive, a current is stored in loop L10, the magnitude of which is determined by the magnitude of the applied current and the relative inductances of paths L10*a* and L10*b*. Thus, if the inductances of paths L10*a* and L10*b* are represented by the values L*a* and L*b* respectively, the magnitude of the stored current, for a given applied current, increases as the ratio L*a*/L*b* is increased. For example, if L*a* equals L*b* and a current of ten units is applied as described above, a current of about five units is stored in the loop. If a current of ten units is applied to a loop wherein the value L*a* is equal to 4L*b* then a current of about eight units is stored in the loop. The relationship set forth below may be employed to determine the approximate value of stored current:

where $I_X\ (La+Lb)=ILa$;

$I_X$=stored current;

$I$=applied current;

$La$=inductance of path L10*a*; and $Lb$=inductance of path L10*b*.

If the loop L10 is to be employed as a decimal storage device, the decimal inputs are applied to terminal L10*d* with the magnitude of the current applied at this terminal determining the value of the decimal entry. For purposes of illustration the inductance of path L10*a*, that is L*a*, is considered to be equal to the inductance of the path L10*b*, that is L*b*. From the above relationship it can be seen that the stored current $I_X$ is then equal to one half the applied current. Thus, if a current input I of two units is applied, a current $I_X$ of one unit is stored in the loop; if a current input I of four units is applied, a current $I_X$ of two units is stored in the loop; etc. Current inputs of 0, 2, 4, 8, 10, 12, 14, 16, and 18 units represent decimal inputs of 0, 1, 2, 3, 4, 5, 6, 7, 8, and 9, respectively, and produce corresponding stored currents in loop L10. Thus, a decimal input of five is applied to loop L10 by energizing the coil of cryotron K2, applying a current input of ten units at terminal L10*d*, deenergizing the coil of cryotron K2, and removing the current applied at terminal L10*d*. As a result of this operation, a current of five units, representative of the decimal value 5, is store in loop L10. Assuming the current applied at terminal L10*d* flows in the direction indicated by arrow I, the current stored $I_X$ in loop 10 is in a clockwise direction.

The cryotron K1 in the output circuit for loop L10*d* is designed to be capable of remaining superconductive when its coil is carrying nine units of current, but to be driven resistive when the coil current is equal to 10 units. The operation in this respect differs from the binary storage devices described above since, in those devices, the cryotron K1 is driven resistive by the presence of the stored current indicative of a binary one. In the decimal application of FIG. 5, the current stored in the loop, which varies from 0 to 9 units according to the value of the decimal entre, is itself insufficient to drive cryotron K1 resistive. Therefore, a read out signal not required in the binary type operation is necessary to interrogate the state of the decimal storage loop of FIG. 5. It should be here noted that the same loops may be employed for both types of storage with an input pulse of 20 units being applied for binary storage applications of the type described with reference to FIGS. 3 and 4. The extra read out signal necessary in the decimal operation is applied at terminal L10*d* at a time when output control cryotron K3 is resistive and the signal may have the wave shape shown in FIG. 5A. This signal rises linearly from zero to a value of twenty current units. Since the inductance values L*a* and L*b* are equal, this current signal, when applied at terminal L10*d*, splits evenly between paths L10*a* and L10*b*. The signal is in a direction to add to any stored current $I_X$ in path 10*a*, which includes the coil of cryotron K1, and to subtract from stored current $I_X$ in path 10*b*. At a time $t_1$, the read out signal rises to a value of two units with one of these units in each of the equal inductance paths L10*a* and L10*b*. If a decimal input of 9 had been previously applied causing a current of 9 units to be stored in loop L10*a*, the total current in path L10*a* is then 10 units and cryotron K1 is resistive. A voltage is then developed at time $t_1$ between the terminals L10*e* and L10*f* in response to the read out current continuously applied at terminal L10*e* during the read out operation. When the decimal value stored in loop L10*a* is less than 9 and there is a stored current of eight or less units in the loop, cryotron K1 remains superconductive at time $t_1$. As the read out input signal rises in magnitude, the cryotron K1 is driven resistive at one of the times $t_2$ through $t_{10}$ in accordance with the value stored in the loop; that is cryotron K1 goes resistive at time $t_2$ when loop L10*a* is storing eight units of current, at time $t_3$ when the loop is storing seven units of current etc., and at time $t_{10}$ when there is no current stored in the loop and it is, therefore, in a decimal zero representing state.

It should be apparent that the read out signal applied at terminal L10*d* need not be a linearly rising signal such as is shown in FIG. 5A but may be in step pulse form, that is a signal which rises two units of current at each of the times $t_1$ through $t_{10}$. When the loop L10 is to be employed in a decimal multi-bit or multi-register circuit, the operation is similar to that described above with reference to FIGS. 3 and 4. Thus, when the circuit of FIG. 3 including this loop and also loops L12 and L14 is to be used in a decimal application and, for example, the decimal value **24*b*** is to be entered in the register and then read out, the operational steps are as follows:

| | Write Operation to Store 24b | Read Operation |
|---|---|---|
| Step 1 | Energize 30X, 30Y, 30NR, 30Z. | Same. |
| Step 2 | Deenergize 30Z | Deenergize 30NR. |
| Step 3 | Energize pulse generators W10, W12, and W14 to apply, pulses of 4, 8, and 12 units, respectively, at terminals L10*d*, L12*d*, and L14*d*. | Energize pulse generators R10, R12, and R14; energize pulse generators W10, W12, and W14 to apply read out signals of types shown in Fig. 5A at terminals L10*d*, L12*d*, and L14*d*. |
| Step 4 | Deenergize 30X and 30Y | Same. |
| Step 5 | Energize 30Z | Energize 30NR. |
| Step 6 | Deenergize W10, W12, and W14. | Deenergize R10, R12, R14. |
| Step 7 | Deenergize 30NR and 30Z | Same. |

Figure 6:
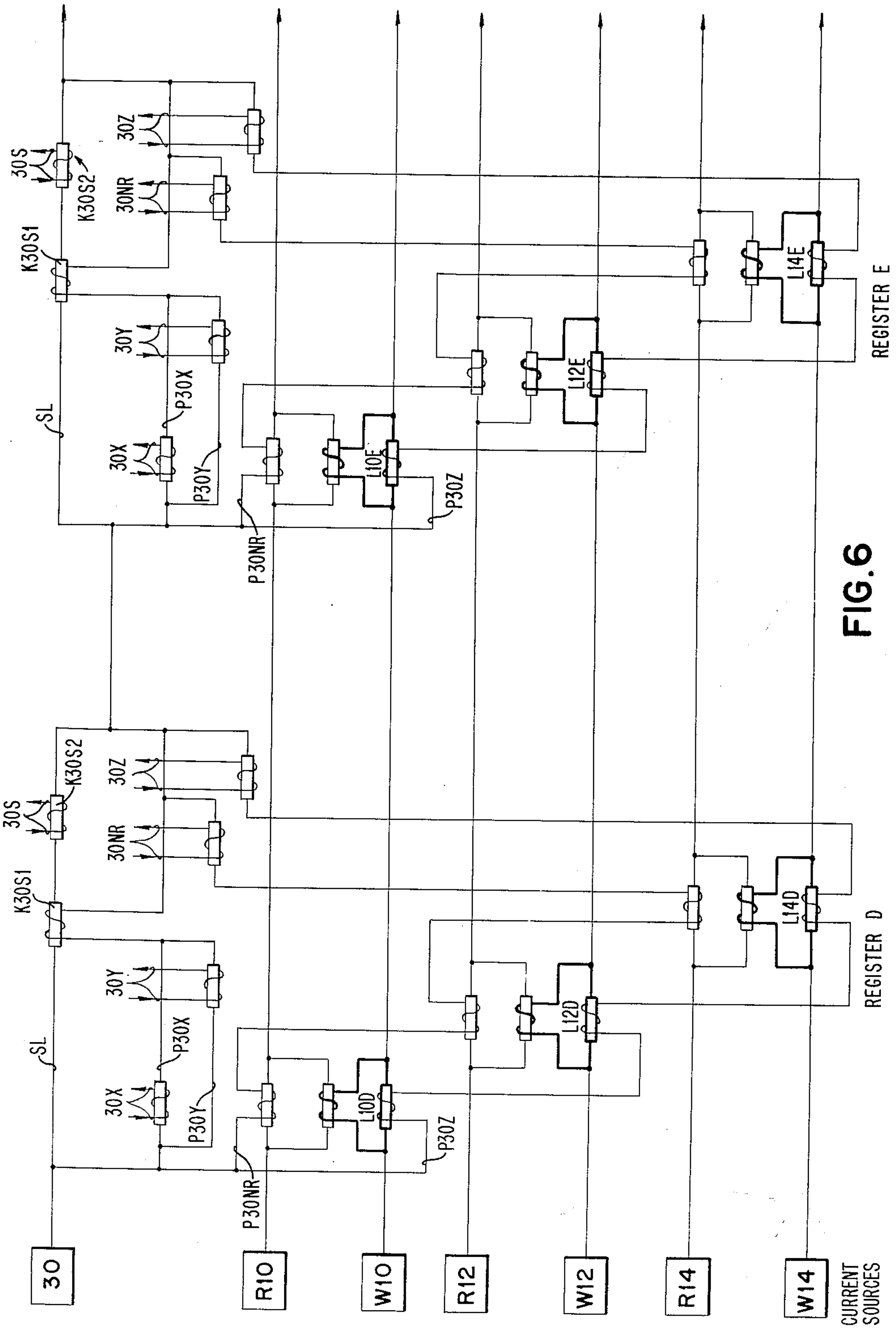
FIGS. 6 and 7 are schematic representations of other embodiments of superconductor registers constructed in accordance with the principles of the subject invention.

FIG. 6 shows a memory of the type shown in FIGS. 3, 4, and 5, which includes two registers, designated D and E each including first, second, and third order storage loops. These storage loops are shown in heavy lines and are designated L10D, L12D; L14D and L10E; L12E, and L14E. The operation of the memory of FIG. 6 is in most respects similar to those previously described differing only in that each of the registers is provided with a shunt current path SL which includes the gates of a pair of cryotrons K30S1 and K30S2. These shunt lines are connected across source 30 in parallel with the paths P30X, P30Y, P30Z and P30NR. The operation of the memory is similar to the operation of the memories previously described in that the registers are addressed by coincidently energizing their X and Y control conductors 30X and 30Y, and writing and reading is accomplished by energizing and deenergizing control conductors 30Z and 30NR in the proper sequence. As in the memories described above, the 30Z control conductors and the 30NR control conductors for the entire memory are energized together with only the register whose X and Y drive lines are energized being caused to undergo either a write or read operation as the case may be.

The purpose of the shunt line SL is to obviate the necessity of initially maintaining the entire register resistive during the first step of each functional operation. When the entire register is thus driven resistive, the current from the source 30 is divided equally between the paths in parallel with this source and because of this it is necessary to take care that the portion of current then in any one of these paths does not drive one of the cryotrons resistive. Further, this type of operation dissipates power and thereby increases the load on the cooling apparatus.

The gate of the cryotron K30S1 in the shunt line SL for each register has its control coil connected to the parallel combination of paths P30X and P30Y for that register. During Step 1 of any read or write operation, the memory is addressed by energizing appropriate combinations of the conductors 30X and 30Y. Only one register is selected during any such operation and one or the other or both of the paths 30X and 30Y for each of the remaining registers remain superconductive and carry the current from the source 30 throughout the operation. In the selected register when each of the paths P30X, P30Y, P30NR and P30Z is initially driven resistive, the current begins to shift out of paths 30X and/or 30Y as the case may be. However, cryotron K30S1 is designed so that it requires almost the entire current supplied by source 30 to hold it resistive and, therefore, once the current shift starts, this cryotron becomes superconductive and the entire current from source 30 is directed through shunt path SL. The current remains in this path until after the conductor 30Z or 30NR is deenergized according to whether a write or read operation is desired. Then the control conductors 30S for all of the registers in the memory are energized, thereby causing the current from source 30 to be directed in the selected register through path P30Z or P30NR as the case may be. The energization of the control conductor 30S for the unselected register has no effect since the current in this register remains in one or the other of the paths 30X and 30Y throughout the entire operation. The shunt path control conductors 30S are not deenergized until the last step of the write or read operation, at which time the current from source 30 is in the path P30X and/or P30Y for each register and the gate of each of the cryotrons K30S1 is resistive.

Figure 7:
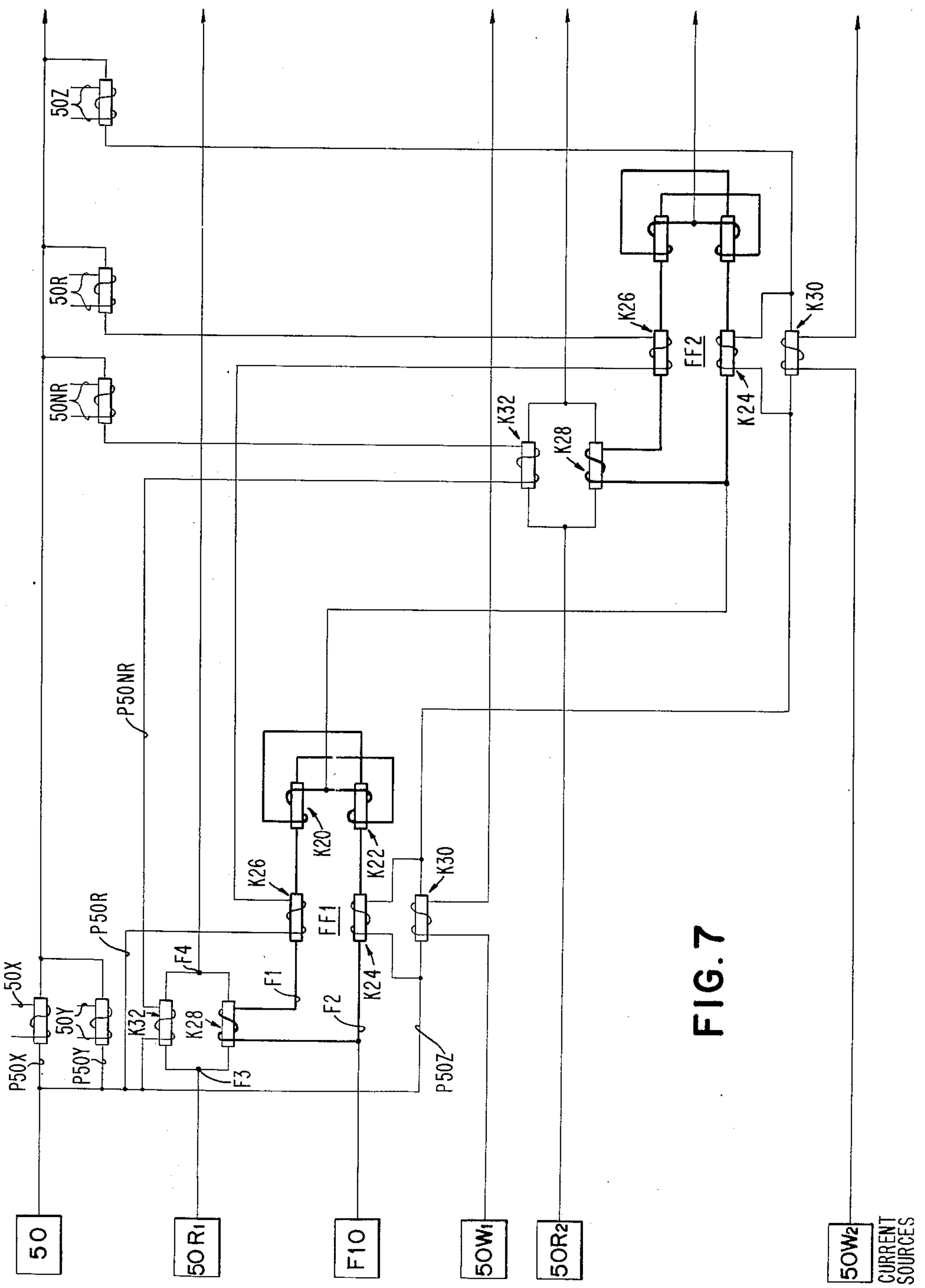

FIG. 7 is a schematic diagram of a register which illustrates the manner in which the principles of the subject invention may be applied to registers and memories which use as storage elements bistable flip flop cryotron circuits. The register of FIG. 7 includes two storage positions each including a flip flop circuit which serves as the actual storage device. The flip flops are designated FF1 and FF2 and, referring to the former, each includes a pair of parallel paths F1 and F2 which are cross coupled through a pair of cryotrons K20 and K22. The two flip flops FF1 and FF2 are connected in series with a D.C. current source F10. The flip flops are each capable of assuming two stable states, one, a binary one state, with the current from source F10 in path F1 and the other, a binary zero state, with the current from source F10 in path F2. Each of the flip flops is switched between these states under the control of a pair of input cryotrons K24 and K26, the former being driven resistive to set the flip flop in its binary one state and the latter being driven resistive to reset the flip flop to its binary zero state. Once either of these input cryotrons has been driven resistive for a sufficient time to shift the current from source F10 into one of the paths F1 or F2, the cross coupled cryotrons K20 and K22 maintain the flip flop in this state until the other of the input cryotrons is driven resistive. Each of the flip flops is provided with an output cryotron K28 which has its control coil connected in the path F1 for the flip flop so that the gate of this cryotron is maintained resistive when the flip flop is in its binary one state. The operation of the circuit is best described with reference to a particular example. For this reason there are set forth below the steps necessary to enter a two digit word "10" in the register, to read out that word, and finally to clear the register. It is assumed that both of the flip flops are initially in their binary zero condition.

| | Write "10" | Read "10" | Clear |
|---|---|---|---|
| Step 1 | Energize 50X, 50Y, 50NR, 50R, and 50Z. | Same | Same. |
| Step 2 | Deenergize 50Z | Deenergize 50NR | Deenergize 50R. |
| Step 3 | Energize and Deenergize pulse resistor $50W_1$. | Energize and deenergize $50R_1$ and $50R_2$. | |
| Step 4 | Deenergize 50X and 50Y. | Same | Same. |
| Step 5 | Energize 50Z | Energize 50NR | Energize 50R. |
| Step 6 | Deenergize 50NR, 50R and 50Z. | Same | Same. |

The memory of FIG. 7 is similar to those previously described, in that current from a source, here designated 50, is shifted between a number of parallel paths to control the various functional operations of the memory. There are five parallel paths connected across source 50. These paths are designated P50X, P50Y, P50R, P50NR, and P50Z, the resistance is introduced into these paths under control of the control conductors 50X, 50Y, 50R, 50NR, and 50Z. Thus, during the first step of the write operation, each of the paths is driven resistive and the current from source 50 divides between the paths. The deenergization of conductor 50Z during Step 2 causes the entire current from source 50 to be directed through path P50Z. When, during Step 3, pulse generator $50W_1$ is energized, a control input cryotron K30 for flip flop FF1 is driven resistive. The entire current from source 50 is then directed through the control coil of cryotron K24 to drive the gate of this cryotron resistive and cause flip flop FF1 to be set to its binary one state. Since a binary zero is to be entered into flip flop FF2 the write pulse generator 50W is not energized during this step. The current from source 50 in path P50Z therefore divides between the control coil for the input cryotron K24 of flip flop FF2 and the gate of the control input cryotron K30 for this flip flop. The design is such that the portion of the current in the control coil of K24 is insufficient to drive the gate of this cryotron resistive and flip flop FF2 remains in its binary zero state. The remaining three steps of the write operation are similar to those of the other memories, the various control conductors being energized and deenergized in a sequence to cause the current from source 50R to be again directed through paths P50X and P50Y.

The read operation differs from the write operation in that control conductor 50 is deenergized during Step 2 and energized during Step 5 to cause the current from source 50 to be directed into path P50R and then back to paths 50X and 50Y, and also in that a pair of read pulse generators $50R_1$ and $50R_2$ are energized to produce outputs indicative of the values stored in the flip flops FF1 and FF2, respectively. These pulse generators are actuated at a time when the current from source 50 is in path 50NR thereby maintaining a read out cryotron K32 for each flip flop in a resistive state. The gates of these read out control cryotrons are connected in parallel with the flip flop output cryotrons K28. With flip flop FF1 in a binary one state and flip flop FF2 in a binary zero state, a voltage output is produced between a pair of terminals F3 and F4 in the output circuit of flip flop FF1 and no voltage ouput is produced in the output circuit for flip flop FF2. At the end of the read out operation the flip flops FF1 and FF2 are still storing the word "10" and the current from source 50 is in paths P50X and P50Y.

During the clear operation the register is initially driven resistive as during the write and read operations and then control conductor 50R is deenergized to cause the current from source 50 to be directed through path P50R. This path includes the coils for the binary zero or reset input cryotron K26 of flip flops FF1 and FF2 and the current from source 50 flowing through these coils drives the gates of these cryotrons resistive. Flip flops FF1 and FF2 are then reset to their binary zero state and, thereafter, the steps of the clear operation are effective to reestablish the current from source 50 in paths P50X and P50Y.

It should be apparent that a plurality of registers of the type shown in FIG. 7 can be connected in a multiregister memory with each register including any given number of storage positions. Any one of the individual registers is addressed for a functional operation by energizing the particular X and Y control conductors for that register. It should be obvious that shunt paths such as are shown in the embodiment of FIG. 6 might be added to any one of the other embodiments and, where such a path is provided, though the memory initially goes resistive when all of the control conductors are energized, the shunt path becomes superconductive immediately and essentially the entire current from the source is directed therethrough.

While there have been shown and described and pointed out the fundamental novel features of the invention as applied to a preferred embodiment, it will be understood that various omissions and substitutions and change in the form and details of the device illustrated and in its operation may be made by those skilled in the art without departing from the spirit of the invention. It is the intention, therefore, to be limited only as indicated by the scope of the following claims.

What is claimed is:

1. In a superconductor memory including a superconductor storage device capable of assuming at least first and second different stable information representing states; a first current path for controlling the application of inputs to said storage device; a second current path for controlling the reading out of outputs from said storage device; a current source; means connecting said first and second current paths in parallel across said current source; means for maintaining each of said first and second paths at a superconductive temperature; first control means for driving at least a portion of said first path resistive; second control means for driving at least a portion of said second path resistive; means for controlling the application of inputs to said storage device when said first and said second control means are simultaneously energized and then said first control conductor is deenergized; and means for controlling the reading of outputs from said storage device when both said control conductors are simultaneously energized and then said second control conductor is deenergized.

2. A superconductor memory including a superconductor storage device capable of assuming at least first and second different stable information representing states; input means for said storage device, output means for said storage device; a first superconductor current path arranged adjacent said input means for activating said input means, a second superconductor current path arranged adjacent said output means for activating said output means; a current source, means connecting said first and said second superconductor paths in parallel across said current source; means maintaining each of said first and second paths at a superconductive temperature; and dual purpose means for introducing resistance into both of said first and said second paths and for then allowing said first path only to again become superconductive to thereby activate said input means and for introducing resistance into both of said first and second paths and for then allowing said second path only to become superconductive to thereby activate said output means.

3. In a superconductor memory including a superconductor storage device capable of assuming at least first and second different stable information representing states; input means for said storage device, output means for said storage device, a plurality of superconductor current paths arranged adjacent the input and output means of said storage device for controlling said input means and said output means, means connecting said plurality of superconductor current paths in parallel across a current source; means maintaining each of said superconductor current paths at a superconductive temperature; a plurality of control conductors, one associated with each of said paths for introducing resistance into the associated path; means for initially energizing all but one of said control conductors for each read and write operation and for then selectively deenergizing and energizing said control conductors in accordance with a first predetermined sequence for each write operation and for deenergizing and energizing said control conductor in accordance with a second predetermined sequence for each read operation.

4. In a superconductor memory including a plurality of superconductor storage devices each capable of assuming at least first and second different stable information representing states; each of said storage devices including input and output means; first, second, third and fourth superconductor current paths connected in parallel across a current source; each of said superconductor paths being maintained at a superconductive temperature; said third superconductor current path being arranged adjacent the output means of each of said storage devices; said fourth superconductor current path being arranged adjacent the input means of each of said storage devices; and means for controlling read and write operations in said memory comprising first, second, third and fourth control conductor means each arranged adjacent a corresponding one of said first, second, third and fourth current paths and effective when energized to introduce resistance into the corresponding one of said paths; each of said first, second, third and fourth control conductors being initially energized for both read and write operations and then said third control conductor being deenergized, said first and second control conductors being deenergized, said third control conductor being energized, and said third and fourth control conductors being deenergized in that order for a read operation, or said fourth control conductor being deenergized, said first and second conductors being deenergized, said fourth control conductor being energized, and said third and fourth control conductors being deenergized in that order for a write operation.

5. In a superconductor memory including a plurality of superconductor storage devices each capable of assuming at least first and second different stable information representing states; a plurality of groups of first, second, third and fourth superconductor current paths, one group for each of said storage devices for reading and writing in that storage device; the superconductor current paths in each group being connected in parallel and the groups of parallel connected current paths being connected in series with a current source; each of said superconductor paths being maintained at a superconductive temperature; a plurality of X address control conductors one for each of said storage devices arranged adjacent the first current path for that device and effective when energized to drive at least a portion of that path resistive; a plurality of Y address control conductors one for each of said storage devices arranged adjacent the second current path for that storage device and effective when energized to drive at least a portion of that path resistive; write control conductor means arranged adjacent the third current paths for each of said storage devices and effective when energized to drive at least a portion of each of said third current paths resistive; and read control conductor means arranged adjacent the fourth path for each of said storage devices and effective when energized to drive at least a portion of each of said fourth paths resistive; said control conductor means being effective to control storing of information in any particular one of said storage devices when the write control conductor means, the read control conductor means, and both the X and Y address control conductors for the particular storage device are energized, and then the write control conductor means only is deenergized; said control conductor means being effective to control the reading out of information from any particular one of said storage devices when the write control conductor means, the read control conductor means, and both the X and Y address control conductors for the particular storage device are energized and then said read control conductor means only is deenergized.

6. In a memory; a superconductor storage device capable of assuming at least first and second different stable information representing states; a single current source; a plurality of superconductor current paths connected in parallel across said source; each of said paths and said storage device being maintained at a superconductive temperature; a first one of said paths being effective when the current from said source is directed therethrough to control the writing of information in said storage device; a second one of said paths being effective when the current from said source is directed therethrough to control the reading of information from said storage device; a further one or more of said paths serving as an address selection means for said device and effective when the current from said source is established therein when maintained in a superconductive state to prevent said current from said source from being directed through either said first or said second path; and control conductor means for each of said paths for initially driving all but a third one of said paths resistive, then allowing said first or second path only to become superconductive and driving said third path resistive to cause the current from said source to be directed through said first path or said second path in accordance with whether information is to be written in said storage device or read out of said storage device, and then allowing said further one or more of said paths to become superconductive and driving said first or said second path, as the case may be, resistive so that the current from said source is removed from that path and directed through said further one or more of said paths.

7. The memory of claim 6 wherein said storage device comprises a closed loop capable of maintaining a persistent current when in a superconductive state; said first current path is arranged adjacent a portion of said loop and is effective, when the current from said source is directed therethrough, to produce a magnetic field which both threads said loop and drives a portion thereof resistive so that, when the current from said source is removed from said path, a persistent current is established in said loop, and said second path includes a portion arranged adjacent said loop and subject to the magnetic field produced by persistent current in said loop so that it is resistive when there is a persistent current stored in said loop.

8. The memory of claim 6 wherein said storage device comprises third and fourth parallel current paths forming a closed loop of superconductor material; a first superconductor gate conductor connected in said third path; a first superconductor control conductor connected in said first path and arranged in magnetic field applying relationship to said first gate conductor for controlling said first gate conductor between superconductive and resistive states in response to current from said source in said first path and said memory includes further current supply means for applying a current to said third and fourth parallel paths forming said loop at a time when there is current in said first path and said first gate conductor is resistive and removing said applied current after said current from said source is removed from said first path and directed through said further one or more of said paths.

9. The memory of claim 6 wherein said storage device is capable of assuming more than two information value representing states; and said further current supply means is controllable to apply different magnitudes of current to said loop in accordance with the value to be stored in said storage device.

10. The memory of claim 6 wherein said memory includes; a storage device comprising third and fourth parallel current paths; a first superconductor gate conductor connected in said third path; a first superconductor control conductor connected in said first path and arranged in magnetic field applying relationship to said first gate conductor for controlling said gate conductor between superconductive and resistive states in response to current from said source in said first path.

11. In a superconductor memory; a plurality of superconductor storage devices each capable of assuming at least first and second different stable information representing states each of said storage devices having an input and an output; superconductor write conductor means arranged adjacent the inputs of each of said storage devices for applying inputs to the storage device; superconductor read conductor means arranged adjacent the outputs of each of said storage devices; superconductor address selection conductor means for said storage devices; superconductor shunt conductor means for said storage devices; a current source; said write conductor means, read conductor means, address selection conductor means and shunt conductor means being connected in parallel across said source; each of said superconductor storage devices, write conductor means, read conductor means, address selection conductor means and shunt conductor means being maintained at a temperature at which it is superconductive in the absence of a magnetic field; and means for controlling read and write operations in said memory comprising write control conductor means, read control conductor means, address selection control conductor means and shunt control conductor means each arranged in magnetic field applying relationship to a corresponding one of said write conductor means, read conductor means, address selection conductor means and shunt conductor means for controlling these means between superconductive and resistive states and thereby directing the current from said source through said address selection conductor means only for storage devices not to be affected during any read or write operation and for directing current from said source first through said shunt conductor means and then through the read or write conductor means only of a storage device which is to be either written in or read from during a read or write operation as the case may be.

12. The memory of claim 11 wherein said memory includes a plurality of groups of storage devices; each of said groups having an individually operable address selection control conductor means for addressing the storage devices in that group during read and write operations; and said read control conductor means for all the storage devices in said memory are serially connected and said write control conductor means for all the storage devices in said memory are serially connected.

13. The memory of claim 11 wherein said address selection control conductor means includes a plurality of separately operable X and Y control conductor means, there being one X control conductor means and one Y control conductor means for each of the storage devices in said memory.

14. The memory of claim 11 wherein said read conductor means, said write conductor means and said control conductor means are part of a continuous strip of superconductor material having a plurality of apertures dividing successive sections of the strip into parallel current paths; the parallel current paths in each said section forming the read, write and address selection conductor means for one of said storage devices.

15. In a superconductor memory; a superconductor storage device capable of assuming at least first and second different stable information representing states; a strip of superconductor material arranged adjacent said storage device; a current source connected to said strip of superconductor material; said strip and said storage device being maintained at a superconductive temperature; said strip having a plurality of apertures dividing said strip into a plurality of current paths in parallel across said current source; and means for controlling reading and writing in said storage device comprising means for introducing resistance into each of said paths and then selectively allowing a particular one only of said paths to become superconductive so that the entire current from said source is then directed through that path; a first information value being written in said storage device when said particular path is a first one of said paths and a second information value being written in said storage device when said particular path is a second one of said paths.

16. In a superconductor memory; a superconductor storage device capable of assuming at least first and second different stable information representing states; a strip of superconductor material arranged adjacent said storage device; a current source connected to said strip of superconductor material; said strip and said storage device being maintained at a superconductive temperature; said strip having a plurality of apertures dividing said strip into a plurality of current paths in parallel across said current source; and means for reading information into said storage device comprising means for introducing resistance into each of said paths and then selectively allowing a particular one only of said paths to become superconductive so that the entire current from said source is then directed through that path; a first one of said paths being arranged adjacent a first portion of said storage device and effective when the current from said source is directed therethrough to cause said storage device to assume a first one of said stable states; a second one of said paths being arranged adjacent a second portion of said storage device and effective when the current from said source is directed therethrough to cause said storage device to assume a second one of said stable states; third and fourth ones of said paths serving as address selection paths for said storage device and each effective when in a superconductive state at a time when the other said paths include resistance to provide a superconductor path for shunting the entire current from said source and thereby preventing current from being directed into either of said first and second paths and control conductor means for each of said paths for first introducing resistance into each of said paths and then allowing either said first or said second path only to become superconductive according to whether said storage device is to be caused to assume said first stable state or said second stable state.

17. In a superconductor memory; a plurality of superconductor storage devices; means for controlling reading and writing operations in said storage devices comprising a strip of superconductor material having a plurality of successive sections each of which is divided by apertures in said strip into a group of parallel superconductor current paths; each of said groups of parallel paths being associated with a corresponding one of said storage devices with at least a first one of the paths arranged in magnetic field applying relationship to a portion of the storage device and a second one of said paths arranged adjacent the storage device to be subject to magnetic fields produced by a current in the storage device; current supply means connected to said strip for supplying current in parallel to the current paths in each said group and in series to the groups of parallel paths; each of said storage devices and said strip being maintained at a superconductive temperature; and control conductor means arranged in magnetic field applying relationship to each of said paths.

18. In a superconductor memory; a plurality of registers; each of said registers including a plurality of superconductor storage devices; each of said superconductor storage devices having an input and an output; a plurality of X address selection conductors one for each of said registers; a plurality of Y address selection conductors one for each of said registers; a plurality of write selection conductors, one for each register and arranged adjacent the inputs for each of the storage devices in that register; a plurality of read selection conductors one for each register and arranged adjacent the outputs for each of the storage devices in that register; a current source; the X, Y, write and read selection conductors for each register being connected in a parallel circuit for that register across said source; the parallel circuits for said registers being connected in series with said current source; said storage devices, X, Y, write and read selection conductors being maintained at a superconductive temperature; and control means arranged in magnetic field applying relationship to each of said X, Y, write and read selection conductors for each of said registers; the control conductors for the write selection conductors for each of said registers being connected in series whereby all of said write selection control conductors are energized together; the control conductors for each of said registers being connected in series whereby all of said read selection conductors are energized together; the X and Y control conductors being connected to form a plurality of X and Y address lines for said circuit whereby when one of said X and one of said Y lines are energized the X and Y control conductors for both the X and Y selection conductors for only one of said registers is energized.

19. In a superconductor register; a plurality of superconductor storage devices each capable of assuming at least first and second stable information representing states; a write control superconductor current path for said register; a read control superconductor current path for said register; one or more address selection superconductor current paths for said register; each of said superconductor storage devices and said superconductor current paths being maintained at a superconductive temperature; said read control current path, write control current path, and said one or more address selection paths for said register being connected in parallel with a current source; said write control current path being effective when the current from said source is directed therethrough to control writing in each of said storage devices; said read control current path being effective when the current from said source is directed therethrough to control reading of each of said storage devices; and means for addressing said register and controlling write and read operations in the storage devices thereof comprising one or more address control conductors one for each of said one or more address selection current paths arranged in magnetic field applying relationship thereto; a write control conductor arranged in magnetic field applying relationship to said write control current path; a read control conductor arranged in magnetic field applying relationship to said read control conductor current path; whereby each of said storage devices in said registers is controlled for a write operation by maintaining said one or more address control conductors and said read control conductor energized at a time when said wire control conductor is deenergized and then deenergizing said one or more address conductors and energizing said write control conductor means; and each of said storage devices in said register is controlled for a read operation by maintaining said one or more address control conductors and said write control conductor energized at a time when said read control conductor is deenergized and then deenergizing said one or more address control conductors and energizing said read control conductor.

20. In a superconductor register operated at a superconductive temperature; a plurality of superconductor storage devices each having input control means and output control means and each capable of assuming at least first and second stable states; a write control superconductor path, the input control means for each of said storage devices in said register being connected in series in said write control current path; a read control superconductor current path; the output control means for each of said storage devices in said register being connected in series in said read control current path; one or more address selection current paths for said register; and a current source; said write control current path including the series connected input control means for each of said storage devices; said read control current path including the series connected output control means for each of said storage devices; said write control current path, said read control current path and said one or more address selection current paths being connected in parallel across said current source; whereby said register is addressed for both reading simultaneously from each of said storage devices and writing simultaneously in each of said storage devices by introducing resistance into each of said one or more superconductor address selection current paths.

21. In a superconductor memory operated at a superconductive temperature; a superconductor storage device having input control means and output control means and capable of assuming at least first and second stable states; one or more address selection current paths for said storage device; write and read control superconductor current paths in which said input control means and output control means for said storage device are respectively connected; a current source; said read control current paths, said write control current path and said one or more address selection means being connected in parallel circuit relationship across said source; and means for addressing said storage device and controlling read and write operations therein by controlling said source current between said paths comprising a read control conductor arranged adjacent said read current path; a write control conductor arranged adjacent said write current path, and address control conductor means arranged adjacent each of said one or more address selection current paths.

22. The memory of claim 21 wherein said current source is a D.C. current source continuously applying current to said parallel connected read, write, and address selection current paths, and each of said control conductors are initially energized simultaneously for each read and write operation and then one or the other of said read and write control conductors is deenergized according to whether a read or write operation is to be performed.

23. The memory of claim 21 wherein said storage device is capable of assuming ten different stable states, each representative of a decimal information value.

24. In a superconductor memory including a plurality of superconductor storage devices each capable of assuming at least first and second different stable information representing states; write, read, and shunt superconductor paths connected in parallel across a current source for controlling write and read operations for said storage devices; each of said paths being maintained at a superconductive temperature; write, read and shunt control conductor means each arranged adjacent a corresponding one of said write, read and shunt paths for selectively driving at least a portion of that path resistive; said write and read control conductors being initially energized and said shunt control conductor being deenergized for each read and write operation and thereafter said write control conductor being deenergized and said shunt control conductor being energized for a write operation, or said read control conductor being deenergized and said shunt control conductor being energized for a read operation.

25. A superconductor storage device comprising a closed loop of superconductor material; means for establishing at least first and second different magnitudes of persistent current in the same direction in said loop comprising: input means coupled to said loop for driving a portion of said loop resistive and providing a flux threading said loop and then allowing said portion of said loop to become superconductive at a time when at least a portion of said net flux is threading said loop; said input means including means electroconductively connected to said loop and controllable to provide a first magnitude of net flux threading said loop when said loop is allowed to become superconductive when a persistent current of said first magnitude is to be stored in said loop and to provide a second magnitude of net flux threading said loop when said loop is allowed to become superconductive when a persistent current of said second magnitude is to be stored in said loop; and means for sensing the magnitude of the persistent current in said loop.

26. A superconductor storage device comprising a closed loop of superconductor material maintained at a superconductive temperature; means for selectively establishing in said loop a plurality of different magnitudes of persistent current in the same direction each representative of an information value; and means for detecting different magnitudes of persistent current stored in said loop; said detecting means including a superconductor gate conductor, and a superconductor control conductor connected in said loop for controlling the state, superconductive or resistive, of said gate conductor, and means for applying interrogation current signals to said loop.

27. A superconductor circuit comprising a closed loop of superconductor material maintained at a superconductive temperature; said loop forming a storage device capable of assuming a plurality of different stable states in each of which a different magnitude of persistent current circulates in the same direction in said loop; and means for controlling said loop to assume said stable states comprising means for first driving at least a portion of said loop into a resistive state and then allowing said loop to become entirely superconductive and for providing when said loop is allowed to become superconductive a net flux threading said loop the magnitude of which differs in accordance with the state the loop is to be caused to assume.

28. A superconductor storage device comprising a loop of superconductor material maintained at a superconductive temperature; said loop comprising first and second parallel superconductor current paths; current supply means connected to said loop for supplying currents of different magnitudes to said loop; control conductor means arranged adjacent said first path and effective when energized to drive at least a portion of said first path resistive and thereby cause the current supplied by said supply means to be directed through said second path so that, when said control conductor means is deenergized and then said current from said supply means is terminated, there is stored in said loop a persistent current the magnitude of which is proportional to the magnitude of the current supplied by said current supply means; a superconductor gate conductor; a superconductor control conductor connected in said loop and arranged adjacent said gate for controlling it between superconductive and resistive states; whereby, when said current supply means supplies a current of predetermined magnitude to said loop, the state; superconductive or resistive of said superconductor gate conductor, indicates the magnitude of the persistent current stored in said loop.

29. A superconductor storage device comprising a closed loop of superconductor material maintained at a superconductive temperature; said loop being capable of assuming a plurality of different persistent current states each representative of an information value; means for interrogating said loop comprising means for applying to said loop an interrogation current signal of varying magnitude which combines therein with said persistent current, and a superconductor gate conductor arranged adjacent a portion of said loop and controllable between superconductive and resistive states in response to said combined persistent and interrogation current in said loop.

30. A superconductor circuit including a superconductor body forming a closed loop of superconductor material storing a persistent current; means for determining the magnitude of the persistent current stored in said loop comprising; means for applying an interrogation current in said loop, a control conductor connected in said loop, said interrogation current and said persistent current combining in said control conductor, a superconductor conductor arranged adjacent to said control conductor and controllable thereby between resistive and superconductive states in accordance with the combined current in said control conductor for manifesting an output indicative of the magnitude of said stored current when said interrogation current is applied.

References Cited in the file of this patent

UNITED STATES PATENTS 2,930,908 McKeon ---------------- Mar. 29, 1960

OTHER REFERENCES

Wireless World, July 1957, pp. 326 to 330 (copy in Class 340—173xc).

IBM Journal, October 1957, pp. 304 to 308 (by R. Garwin) (copy in 340—173xc).